Dec. 29, 1925.

C. R. TAYLOR 1,567,343

BAKING MACHINE

Filed March 29, 1922

Inventor
CARL R. TAYLOR.

By Lloyd L. Evans
Attorney

Dec. 29, 1925.
C. R. TAYLOR
BAKING MACHINE
Filed March 29, 1922
1,567,343
4 Sheets-Sheet 4
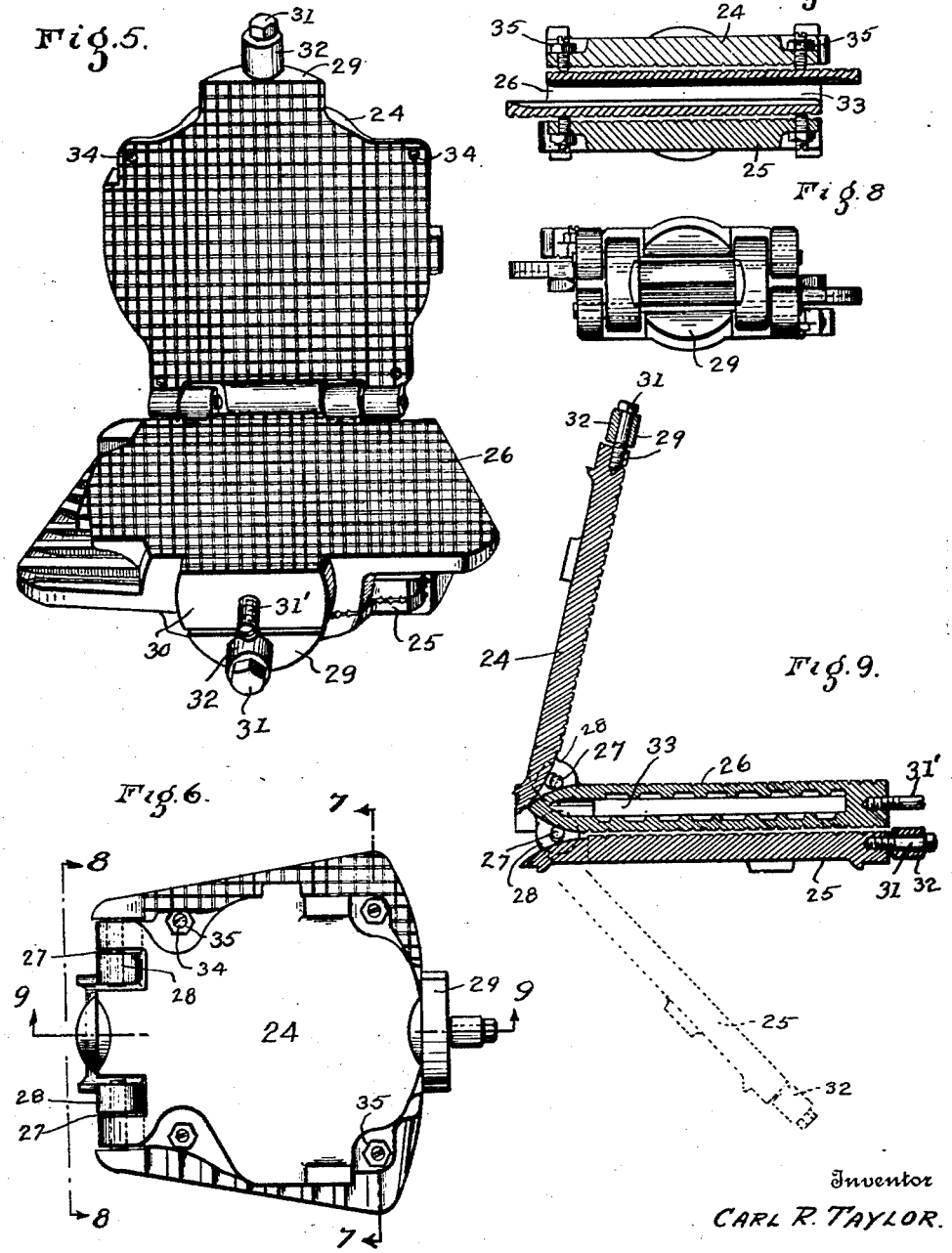
Inventor
CARL R. TAYLOR.
By
Lloyd L. Evans
Attorney Patented Dec. 29, 1925.

1,567,343

UNITED STATES PATENT OFFICE.

CARL R. TAYLOR, OF CLEVELAND, OHIO.

BAKING MACHINE.

Application filed March 29, 1922. Serial No. 547,886.

*To all whom it may concern:*

Be it known that I, CARL R. TAYLOR, a citizen of the United States, residing at Cleveland, in the county of Cuyahoga and State of Ohio, have invented a certain new and useful Improvement in Baking Machines, of which the following is a full, clear, and exact description, reference being had to the accompanying drawings.

This invention relates to batter baking machines and pertains to that class especially for baking a suitable batter mixture which when baked can be converted into receptacles for ice cream, commonly known as ice cream cones, and also can be used for other purposes.

The object of my present invention is to provide an improved construction of baking machine having a series of baking plates in each of which a plurality of cakes may be baked simultaneously, whereby the capacity of the machine is increased.

Another object of my invention is to provide a means for inverting the baking plates to permit ready insertion and withdrawal of the cakes from the baking plates and to economize in the use of gas or other heating means employed.

A further object is to provide a baking plate constructed to evenly bake each side of a plurality of superposed cakes contained therein.

A further object of the invention is to provide an improved device for automatically inverting the baking plates.

A further object of the invention is to provide a machine in which the baking plates may be quickly inserted and removed.

These and other objects of the invention which will be readily apparent to those skilled in the art I obtain by the construction illustrated in the accompanying drawings.

In the accompanying drawings forming a part of this specification,

Fig. 5 is a perspective view of the cake baking plates with the upper leaf in raised position.

Fig. 6 is a top plan view of the baking plate.

Fig. 7 is a section on the line 7—7, Fig. 6.

Fig. 8 is a view looking at the plate from the rear, as indicated in line 8—8, Fig. 6.

Fig. 9 is a section on line 9—9, Fig. 6.

Fig. 10 is a section on line 10—10, Fig. 1.

Figure 1:
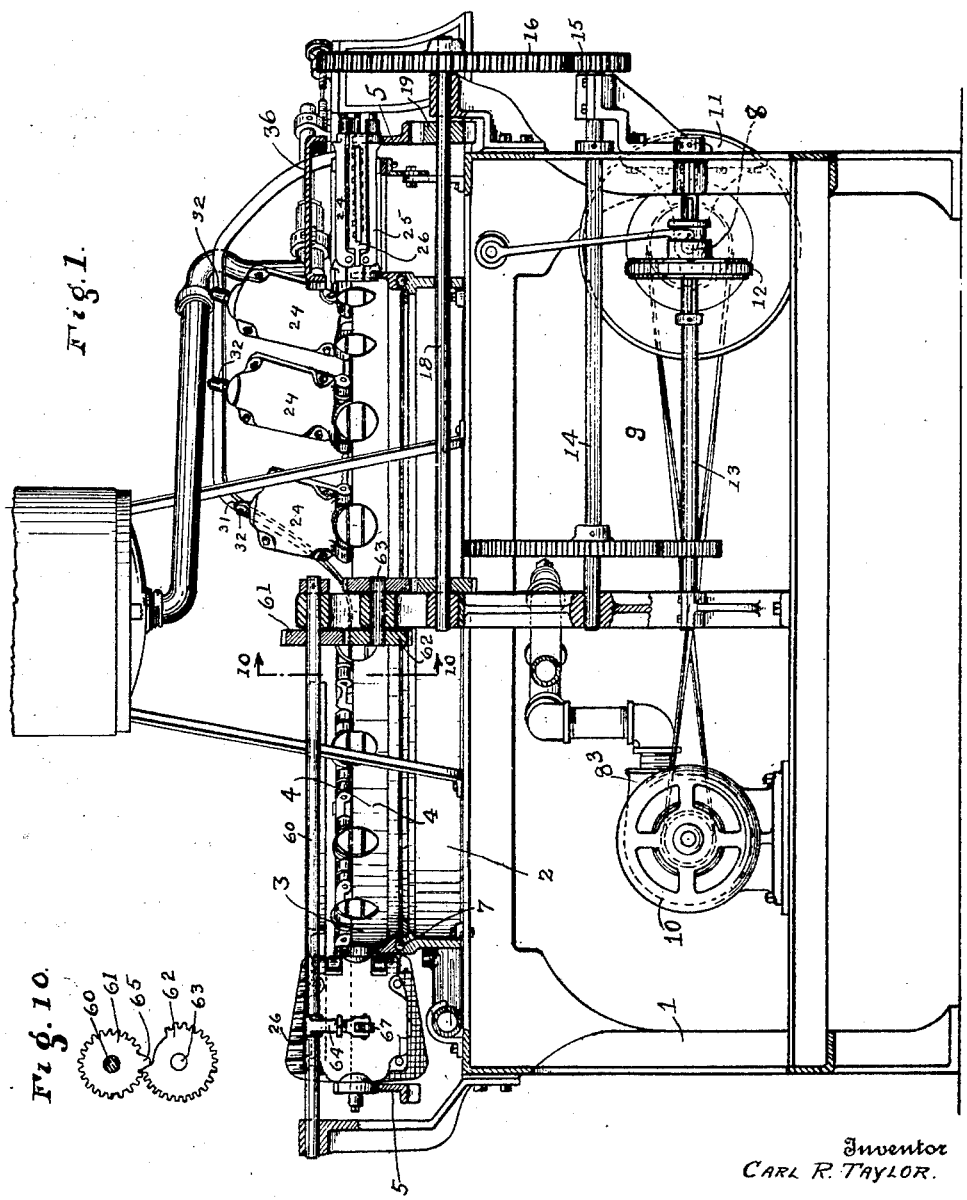
Figure 1 is a side elevation partly in section.

Referring to the drawings, the frame 1 consists of suitable uprights and cross bars upon the top of which is mounted an annular track 2. The table 3 consists of inner and outer concentric rings 4 and 5, connected by regularly spaced radial webs 6. The inner ring 4 is of the same size as the annular track 2 and is superposed thereon. Suitable ball bearings 7 are interposed between the two rings and are positioned in complementary grooves in the two rings whereby the table 3 is rotatably mounted upon the track 2 and held against lateral displacement with respect thereto.

In order to drive the rotary table 3 a power shaft 8 is provided which is driven by a belt 9 leading from any suitable source of power such as the motor 10. On the power shaft 8 is mounted friction wheel 11, which is engaged by the edge of the friction gear 12 which is mounted on a shaft 13 at right angles to the shaft 5. The friction gear 12 is slidably mounted so that it can be moved to engage different portions of friction wheel 11 and thus regulate the speed at which the shaft 13 is rotated. The shaft 14 is driven through reduction gears from shaft 13. The shaft 14 drives shaft 18 through reducing gears 15 and 16 and shaft 18 carries a gear 19 which engages the outer ring 5 of the table 3, which is provided on its under side with gear teeth, and thereby drives the table 3.

Upon the table between the inner and outer rings 4 and 5 and radial webs 6 are mounted a plurality of baking units 23 which consist of upper and lower leaves 24 and 25 and a middle leaf or plate 26. The upper and lower leaves 24 and 25 are hinged on pintles 27 which are carred by extensions 28 projecting from the rear of the central member 26. The rear ends of the leaves 24 and 25 and also the central member are correspondingly curved so that the leaves may swing to an open position substantially 90° from the central member. At the rear and at the front thereof, each of the hinged leaves 24 and 25 carry integral segmental extensions 29 which together with cooperative extensions 30 from the central plate form, when the leaves are closed, cylindrical trunnions which fit corresponding recesses in the rotary table 3, so that the baking units may be inverted by rotating them on the axis through the trunnions. Thus either leaf 24 or 25 may be on top. The extensions 29 carry protruding bolts or pins 31 on which anti-friction rollers 32 are mounted to reduce the friction when they engage the cams 40 and 41 hereinafter described, for opening and closing the baking units. The extensions 29 and extension 30 at the rear hinged ends of the leaves are beveled off on their opposing surfaces so that the leaves can be opened substantially 90° to permit the insertion of batter and removal of cakes.

The central member 26 of the baking units is hollow, having upper and lower spaced walls forming a transverse passage or heat chamber 33 extending laterally therethrough. The walls of the passage 33 are arranged so that one extends beyond the body of the baking unit on one side, and the other extends beyond the body of the baking unit on the other side. This construction enables that wall of passage 33 which is uppermost to receive heat directly from the gas flame or other source of heat and direct the heated gases into and through the passage 33 of the central member 26. Between every two radial webs 6 is a baking unit. The edges of the side wall extensions of the passage 33 are radial of the machine and parallel to the webs 6, so that there are no gaps for the heat coming upwardly from the burners to pass directly between plates and webs without engaging one of the plates of the baking units, that is, either on the lower baking leaf which includes one side extension, or on the other extension which directs the heat through passage 33 and heats the upper unit. In other words the arrangement of the baking units is such that the only passages for the heated gases, collecting under the baking units and webs, to go through are the passages 33. The opposed walls of the passage 33 have ribs or corrugations and their thickness and height are so designed that they will retain just sufficient heat to evenly bake the sides of the two cakes facing the central member 26, so that when the cakes are completely baked and removed they will be browned to the same extent on the sides thereof which were facing the central member 26 as well as on their outwardly facing sides. The leaves 24 and 25 of baking plates each carry a plurality of small set screws 34 extending therethrough adjacent their edges and engageable with the central member 26 to properly position these leaves and hold them slightly spaced from the central member 26. These set screws are securely held in adjusted position by lock nuts 35.

Overlying the rotating table 3 and baking plates 23 is a stationary cover 36 which is supported from the frame of the machine by arms 37 carried by vertical supports 38 secured to the frame 1. This cover extends around the machine over the plates 23 concentrically with the rotating table and acts as a hood or cover overlying the table and baking units except where it is interrupted for the turning mechanism hereinafter described and the plate opening and closing mechanism where the baked cakes are removed and the fresh batter inserted.

Figure 2:
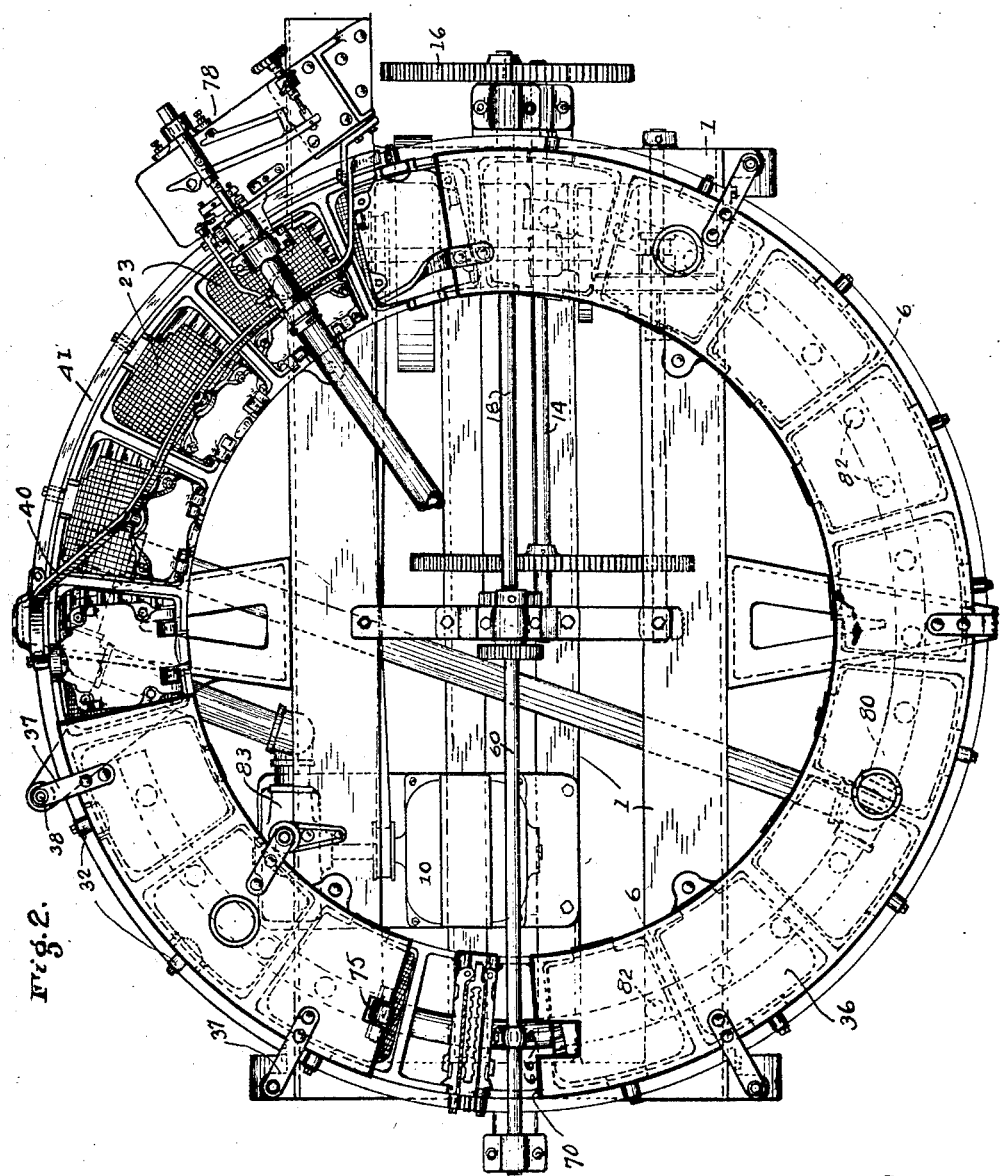
Fig. 2 is a top plan view.
Figure 3:
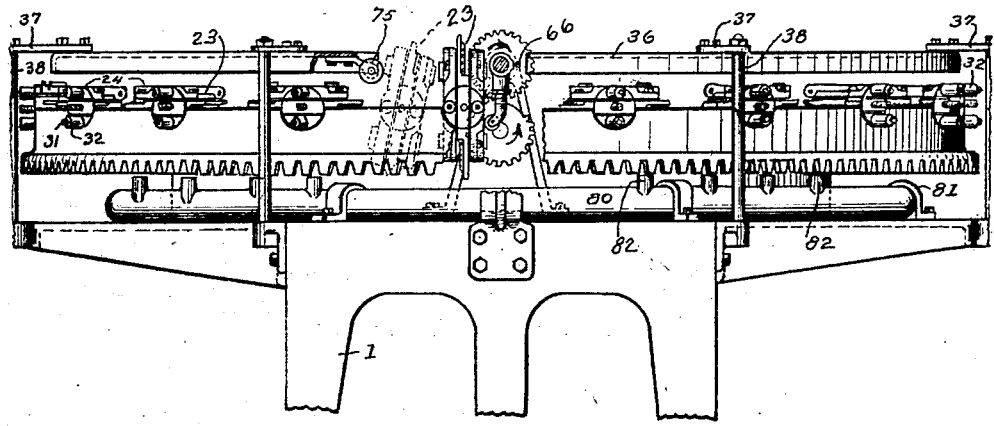
Fig. 3 is a side elevation showing the turn-over device.
Figure 4:
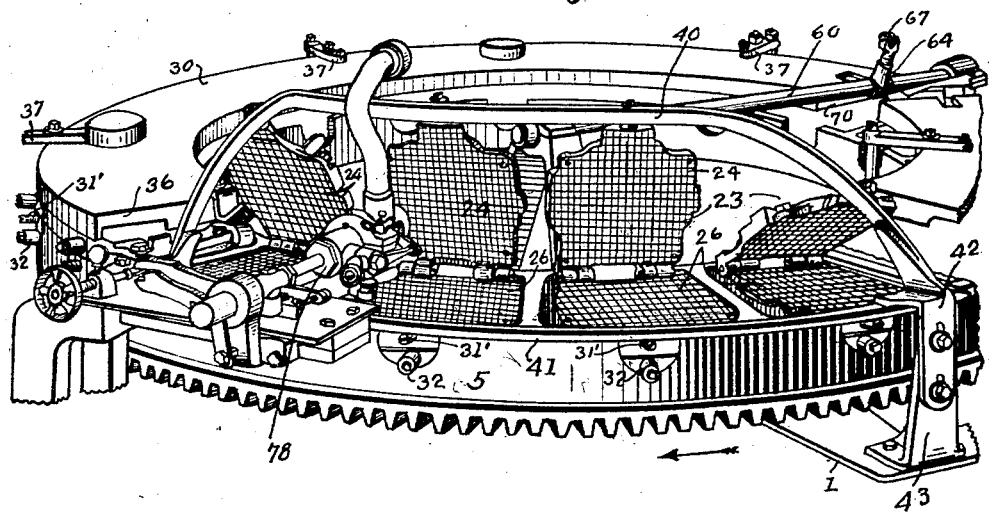
Fig. 4 is a perspective view showing the plates together with a cam mechanism for opening them.

The rotating table travels in the direction indicated by the arrow in Fig. 4, and the baking units upon reaching the cam track 40 are automatically opened, due to the fact that the upper roller 32 engages and moves upwardly on the cam 40. The entire unit cannot be lifted up off the rotating table, however, even though the cake should stick sufficiently to cause the upper leaf to tend to carry the remainder of the plate along with it, for the pin 31' extending from the central plate 26 of the baking unit engages the retaining cam strip 41 which extends along the periphery of the outer ring 5 and is positively held from upward movement. In other words, when a baking unit reaches the cams 40, 41, the progressive rotating movement causes the pins 31 and 31' to be positively separated and the upper leaf of the unit raised. As soon as the unit is opened, the baked cake can be removed and a fresh supply of batter dropped on to the central member 26 by a batter feeding mechanism indicated at 78 in Figs. 2 and 4 and described in my Patent #1196174, dated August 29, 1916. After receiving the supply of batter the upper leaf falls by gravity as the roller 32 rolls down the end of cam 40. The cams 40, 41, are carried by the angle members 42 which are adjustably secured to the supports 43 carried by the frame of the machine.

The baking plates are automatically turned over after they have received a batch of batter and have traveled with the table until they reach the turnover mechanism. This mechanism consists of an arm 64 carried by the shaft 60 which is driven by special gears 61 and 62 (Fig. 10). The constantly rotating mutilated gear 62 is carried by shaft 63, which in turn is driven through gears by shaft 15, previously mentioned. The mutilated gear 62 causes the shaft 60 to have alternate rotative movements and periods of rest as the gear 61 and consequently the shaft 60 does not turn while the mutilated part of the gear 62 is passing the guide tooth 65 of gear 61. The arm 64 is secured to the shaft 60 by suitable means such as set screws 66 and this arm terminates in an anti-friction roller 67. When the baking units get to the point in their travel where hood 36 is interrupted, as shown at 70, the arm 64 engages the baking unit and rotates it on the pivots 26 and 27 until it approaches the vertical position or even passes it. The mutilated gear 62 is timed to permit the gear 61 to rest at this point so that the arm 64 will not swing upwardly in its circle of rotation until the baking unit is carried by the table 3 beyond the circle of rotation of the arm 64. This is to prevent the arm 64 from contacting in its upward swing with the baking unit and returning the unit to an improper inclination, that is so the forward edge is above the horizontal but not above roller 75. When in such position the inversion can not be completed when the unit reaches the roller 75 located at the other side of the interruption in the cover 36. The roller 75 is mounted on the cover 36 to engage the inclined baking plate and complete its inversion or rotation of substantially 180°. As soon as a baking plate is out of the reach of the arm 64, the gear 61 is again picked up by the gear 62 and the shaft 60 commences rotation so that the arm 64 can engage the next succeeding plate.

Any suitable source of heat may be supplied for baking the batter, but preferably a gas flame is used, the gas being supplied through a circular pipe 80 secured to the frame of the machine by brackets 81 with frequent burners 82. If desired, a blower 83 may be secured to the motor shaft to force the gas and air through the pipe 80.

The cycle of operation is substantially as follows:

The batter is deposited successively upon the upper side of the central member 26 while the uppermost leaf 24 is held open by the cam track 40. As the table turns the roller 32 rides down the end of the cam track 40, lowering the cover leaf 24 upon the central member. The closed baking unit is then carried beneath the hood 36 and subjected to the gas flame. When the turnover arm 64 is reached the baking unit 23 is turned over, bringing the empty compartment thereof to the top. When the cam track is again reached, the leaf 25 is opened and batter is deposited upon the central member 26 on the side opposite the filled compartment. The baking unit is again carried beneath the hood 36 and subjected in its reversed position to the gas flame, again reversed and brought to the cam track 40 where the leaf 24 is lifted, exposing the cake in the upper compartment which has been twice carried around the machine. The baked cake is then removed and batter again deposited upon the central member 26. The double baking unit employed in connection with the heating reversing and filling mechanism herein shown enables a machine of a given capacity to be constructed in a more compact form with a corresponding saving in fuel requirements.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a machine of the class described a rotary table, a plurality of baking units pivotally mounted on said table, each of said units consisting of plates adapted to hold a plurality of cakes between them in superposed position, means for rotating said table, means for applying heat to said baking units, means to turn said units during a rotation of said table whereby both sides of said cakes will be evenly baked.

2. In a machine of the class described an endless conveyor comprising a series of baking units, each provided with a plurality of cake compartments having movably mounted covers, means for continuously moving said conveyor, means for applying heat alternately to opposite sides of said compartments, means at one side of said conveyor for opening said covers, and means for holding each cover closed during alternate movements thereof past said opening means.

3. In a machine of the class described a rotary table, a plurality of baking units mounted on said table, a heating element disposed beneath said units, said units comprising a plurality of superposed compartments to simultaneously bake a plurality of cakes, said compartments being spaced vertically and offset laterally to permit the superposed compartments when substantially horizontal to receive heat simultaneously from said heating element, and means to turn said units over upon rotation of said table so that the opposite sides of the superposed compartments will directly receive heat from said heating element.

4. In a machine of the class described a baking unit comprising a central hollow member having upper and lower leaves pivoted thereto and forming therewith superposed cake receiving compartments, said spaced upper and lower walls of said central member being offset laterally with respect to each other to provide overhanging heat deflecting projections, and means on the ends of said central member and leaves cooperating to form trunnions to facilitate the mounting of said units for pivotal movement.

5. In a machine of the class described a rotary table, a series of baking units mounted on said table, each of said baking units having a plurality of closed cake receiving compartments, means to invert said units during each revolution of the table and means to open each compartment during alternate revolutions of said table.

6. In a machine of the class described a rotary table, a plurality of baking units pivotally mounted thereon, said plates comprising a central hollow plate having upper and lower spaced walls providing a heating passage therethrough, and outer hinged leaves povotally connected on opposite sides of said central plate, one wall of said hollow plate extending beyond the body of the plate on one side and the other wall extending beyond the body of the plate on the opposite side, means to invert said units during a revolution of the table, and a heating element disposed beneath the plates.

7. In a machine of the class described a rotary table, a series of baking units pivotally mounted thereon, means for inverting said units during each revolution of said table, a heating element disposed beneath said units, and means for retaining cakes in said units during two revolutions of said table.

8. In a machine of the class described a baking unit comprising a hollow middle plate having spaced upper and lower walls forming a passage therethrough, upper and lower leaves hinged to said middle plate, one wall of said chamber extending beyond the body of the plate in one direction and the other wall of said chamber extending beyond the body of the plate in the opposite direction, the opposing faces of said upper and lower walls having transverse ribs to retain heat to facilitate the uniform baking of the cakes.

9. In a machine of the class described, a rotary table, a series of rotatably mounted baking units thereon, a rotatably mounted striker arm beneath said table and engageable with said units, means for continuously driving said table, means for intermittently driving said striker arm, said driving means being timed so that said striker arm upon successive movements thereof engages successive units.

10. In a machine of the class described, a rotary table, a series of rotatably mounted, substantially flat, baking units thereon, means for continuously rotating said table, a striker arm rotatably mounted beneath said table, means for turning said arm to engage each unit at the rear of its pivot and move said units to approximately a vertical position and for stopping said arm while said units move clear of said arm.

11. In a machine of the class described an endless conveyor, comprising a series of baking units each provided with a pair of cake compartments having movably mounted covers, means for continuously moving said conveyor, means for applying heat to said compartments, means at one side of said conveyor for opening said covers, means for holding each cover closed during alternate movements past said opening means, and means for supplying fresh batter to said compartments when opened.

12. In a machine of the class described, a rotary table, a series of substantially flat baking units thereon, said units comprising hinged plates having a plurality of cake receiving compartments therebetween, means associated with said table for holding said units in horizontal position, means at one side of said table for inverting said units, means beneath said table for applying heat to said units, and means alongside said table for engaging said hinged plates to open said compartments.

13. A baking unit comprising a hollow middle plate having spaced walls offset laterally with respect to each other, the inner sides of said walls having transversely extending ribs, and leaves pivoted on opposite sides of said plate along one edge thereof and cooperating with said offset walls to form therewith cake receiving compartments.

14. A baking unit comprising a middle plate and leaves pivoted along one edge and on opposite sides of said middle plate, segmental lugs upon the pivotal edge of said leaves, a complemental lug upon said edge of the middle plate, corresponding lugs upon the opposite ends of said leaves and middle plate, said segmental and complemental lugs upon opposite ends of said leaves and middle plate forming trunnions for said unit when said leaves are in closed position.

15. In a machine of the class described, a rotary table having radial webs, baking units mounted on said table between the webs, said units having cake receiving compartments and open passages between them, heating elements beneath said table, said units and webs preventing escape of hot gases except through said open passages, whereby the upper cake receiving compartments are heated.

16. In a machine of the class described, a rotary table having radial webs, baking units mounted on said table between every pair of such webs, said units having a plurality of cake baking compartments with open passages between them, overhanging projections formed on the sides of said units, said units and projections substantially filling the spaces between the webs, and certain of said projections directing the hot gases through said open passages.

17. In a machine of the class described, a rotary table having radial webs, baking units rotatably mounted on said table between said webs, said units having a plurality of cake baking compartments with open passages therebetween, overhanging projections on the sides of said units, one of said projections serving to direct the hot gases through said passages when the unit is in one position and the other projection serving to direct the gases through said passages when the unit is inverted.

18. In a machine of the class described, a rotary table, a plurality of baking units mounted on said table between radial webs, a heating element disposed beneath said units, said units comprising a middle plate having a chamber therethrough and upper and lower leaves cooperating with said middle plate and forming therewith cake receiving compartments, said middle plate having an overhanging projection at one side thereof to direct gases through said chamber and having an overhanging projection on the other side thereof, said projections substantially filling the space between the adjacent radial webs to prevent escape of hot gases except through said chamber.

19. A baking unit comprising a central, hollow member and outer leaves pivoted thereto to form superposed cake receiving compartments, means to direct heat through said central member when either side is disposed toward the source of heat, and means upon the opposing faces of said central member to retain heat to facilitate the uniform baking of said cakes.

20. A baking unit comprising a central, hollow member and outer leaves pivoted thereto to form superposed cake receiving compartments, said central member and leaves having extensions cooperating to provide trunnions for mounting the unit to permit pivotal movement thereof as a whole.

21. The combination specified in claim 20 in which the extensions on the pivoted ends of said leaves are cut away to permit opening of said leaves without interfering with the extension on said central member.

In testimony whereof, I hereunto affix my signature.

CARL R. TAYLOR.